United States Patent [19]

Sandulyak et al.

[11] Patent Number: 4,492,633

[45] Date of Patent: Jan. 8, 1985

[54] SEPARATOR FOR SEPARATING FLUID MEDIA FROM MINUTE PARTICLES OF IMPURITIES

[75] Inventors: Alexandr V. Sandulyak; Vyacheslav I. Garaschenko; Nikolai V. Yatskov, all of Rovno, U.S.S.R.

[73] Assignee: Ukrainsky Ordena Druzhby Narodov Institut Inzhenerov Vodnogo Khozyaistva, U.S.S.R.

[21] Appl. No.: 488,998

[22] Filed: Apr. 27, 1983

[30] Foreign Application Priority Data

Feb. 26, 1982 [SU] U.S.S.R. .............................. 3402868

[51] Int. Cl.³ .............................................. B01D 35/06

[52] U.S. Cl. .................................... 210/223; 210/243

[58] Field of Search ............... 210/222, 223, 695, 243; 55/3, 100; 209/223 A, 232, 214

[56] References Cited

U.S. PATENT DOCUMENTS 4,366,065 12/1982 Leslie et al. ........................ 210/222

FOREIGN PATENT DOCUMENTS 585880 12/1977 U.S.S.R. ................................ 55/100

688232 9/1979 U.S.S.R. ................................ 210/223

698658 11/1979 U.S.S.R. ................................ 210/223

715507 2/1980 U.S.S.R. ................................ 210/695

784894 12/1980 U.S.S.R. ................................ 210/222

*Primary Examiner*—Richard V. Fisher

*Assistant Examiner*—John Czaja

*Attorney, Agent, or Firm*—Steinberg & Raskin

[57] ABSTRACT

A separator for separating fluid media from minute particles of impurities incorporating a housing with a partition arranged to form two chambers, one containing a ferromagnetic filtering packing and the other, a filtering packing in a ferroelectric material; a space at an end of the housing serving to connect the chambers to each other and pipes at the other end of the housing used to feed and discharge a fluid medium; and a magnetic system for a magnetic field in the zone of the housing.

7 Claims, 6 Drawing Figures

SEPARATOR FOR SEPARATING FLUID MEDIA FROM MINUTE PARTICLES OF IMPURITIES

FIELD OF THE INVENTION

The present invention relates to apparatus for purifying fluid media and has specific reference to separators employed to separate fluid media from minute particles of impurities. It may find application in the chemical, food and pharmaceutical industries, mechanical and power engineering and elsewhere preferably as a means of separating fluids from particulate material with a size of 0.1-10 $\mu$m which accounts for a fraction of $10^{-5}$ to $10^{-8}$ of the total mass.

BACKGROUND OF THE INVENTION

Known in the art are various apparatus used to purify fluids by virtue of a magnetic or electric field which removes the minute impurities present in the fluid. So, there is known a separator for separating fluids from particulate material, incorporating a cylindrical housing with an internal partition arranged so as to form two chambers each representing a segment of a circle in cross section, one being filled with a ferromagnetic filtering packing and the other being void (cf. USSR Inventor's Certificate No. 698,658; published on Nov. 25, 1979). A means of magnetization in the form of a solenoid surrounding the housing from the outside sets up a magnetic field around the housing. A space at one end of the housing connects the chambers to each other and pipes at the top of the other end of the housing admit and discharge a fluid medium. On entering the void chamber, the fluid medium is exposed to the magnetic field set up therein with the result that the ferromagnetic particles contained in the fluid grow larger and continue to grow so when the fluid enters the connecting space. In the chamber containing the ferromagnetic packing, the ferromagnetic particles are separated from the fluid.

However, the known apparatus fails to separate from the fluid the bulk of electrically charged particles which do not belong to the ferromagnetic kind; these are removed only partially, being accidentally carried away by the ferromagnetic particulate material.

SUMMARY OF THE INVENTION

The main object of the invention is to improve the degree of the purification of fluid media from minute particles of impurities.

Another object of the invention is to improve the efficiency of separators.

These objects are realized due to the fact that in a separator for separating fluid media from minute particles of impurities, comprising a housing, a partition arranged in the housing so as to form two chambers one whereof contains a ferromagnetic filtering packing, a means of magnetization producing a magnetic field around the housing, a space at an end of the housing which serves to connect the chambers to each other, pipes located at the other end of the housing and used to feed and discharge a fluid medium, the other chamber is filled according to the invention with a filtering packing of a ferroelectric material.

Should the ferroelectric packing fail to exhibit a spontaneous electric polarization, it is expedient to provide the other chamber with electrodes.

To enhance the magnetizing effect exposed to which are the ferromagnetic particles, it is also expedient to introduce a ferromagnetic packing into the chamber filled with the ferroelectric packing.

In those cases when it is essential that the interval of time during which a voltage is to be applied across the electrodes is reduced to a minimum, it is further expedient that the ferroelectric packing is an electret.

An advantage of such a separator resides in the fact that a very strong and highly nonuniform electric field is set up between the constituents of the ferroelectric packing in the other chamber due to the property of ferroelectric materials to exhibit a permanent electric polarization and a high relative permittivity. The electric field thus established creates favorable conditions for the removal of the electrically charged particles from the fluid passing through the ferroelectric filtering packing. Thus, simultaneously with the separation of the ferromagnetic particles from the fluid in the ferromagnetic packing also taking place is the separation of the electrically charged particles in the ferroelectric packing with the result that the degree of purification is improved and so is the product quality.

The electrodes the ferroelectric packing is fitted with, are a valuable expedient when the ferroelectric packing fails to exhibit a spontaneous electric polarization. They take over and assure controlled functioning of the ferroelectric packing, providing for a requisite degree of the electric polarization of this packing and for possible changes of this degree depending on the properties of the fluid medium and those of the particulate material present therein. The electrodes are also doubling as a means of the depolarization carried out from time to time to regenerate the ferroelectric packing and dispose of the separated particulate material. This feature shortens the down periods and extends the filtering cycles.

Another advantage of the separator according to the invention is the recourse to a ferromagnetic packing placed into the same chamber with the ferroelectric packing. The ferromagnetic packing augments the magnetic field in the locality so that a preliminary magnetization of the ferromagnetic particles followed by their sticking together and the formation of larger particles takes place before the fluid enters the ferromagnetic packing. The outcome is a higher degree of purification and improved product quality.

If the ferroelectric packing is made from an electret, the electrodes need not be permanently connected across a source of power. A short-term energizing of the electrodes for the periodical depolarizations of the electret during the regenerating cycles and the periodical polarizations thereof after the regeneration and preparatory to operation is all what is necessary in this case.

BRIEF DESCRIPTION OF THE DRAWINGS

Preferred embodiments of the invention will now be described with reference to the accompanying drawings in which according to the invention.

DETAILED DESCRIPTION OF THE INVENTION

Figure 1:
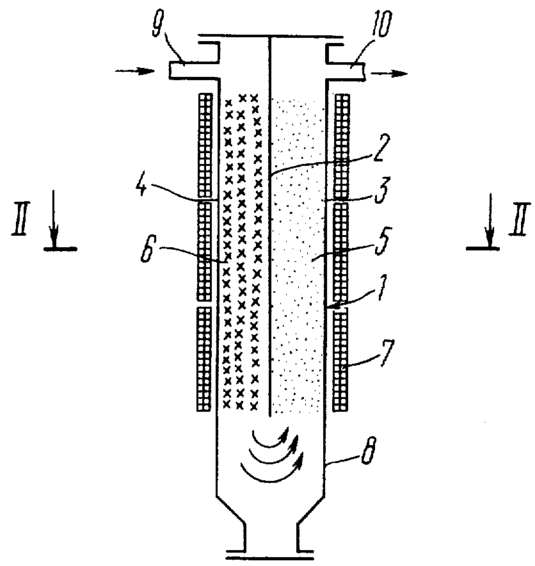
FIG. 1 is a sectional elevation of a separator for separating fluid media from minute particles of impurities featuring chambers each representing a segment of a circle in cross section and a means of magnetization in the form of a solenoid.
Figure 2:
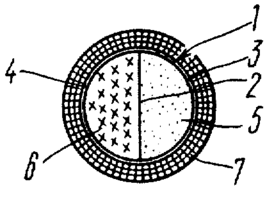
FIG. 2 is a section on line II—II of FIG. 1.

Referring to FIGS. 1 and 2, the separator for separating fluid media from minute particles of impurities comprises a cylindrical housing 1 with an internal partition 2 arranged so as to form two chambers 3 and 4 each representing a segment of a circle in cross section, chamber 3 containing a ferromagnetic filtering packing 5 and chamber 4 being filled with a ferroelectric filtering packing 6. A space 8 at the lower end of the housing 1 connects the chambers 3 and 4 to each other and pipes 9 and 10 at the upper end of the housing serve to feed and discharge a fluid medium. Outside the housing 1 and coaxially therewith there is provided a solenoid 7.

Figure 3:
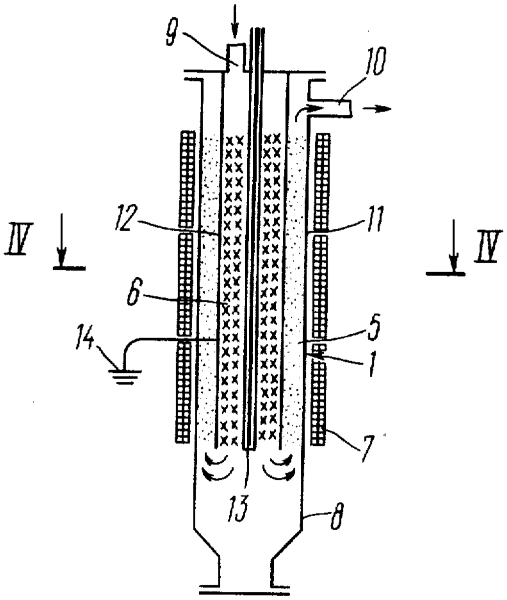
FIG. 3 is a sectional elevation of a separator similar to that of FIG. 1 featuring, however, coaxial chambers and an electrode provided in the internal chamber.
Figure 4:
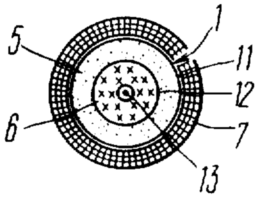
FIG. 4 is a section on line IV—IV of FIG. 3.

The separator depicted in FIGS. 3 and 4 is similar to that of FIGS. 1 and 2 except that the chambers 11 and 12, both of cylindrical cross section, are arranged coaxially one inside the other and the internal chamber 12 containing the ferroelectric packing 6 is provided with a central electrode 13. Functioning as the other electrode is the cylindrical wall of the chamber 12 which is made from a current-conducting material and is provided with a grounding device 14. The wall of the chamber 12 also doubles as the partition between the chambers 11 and 12.

Figure 5:
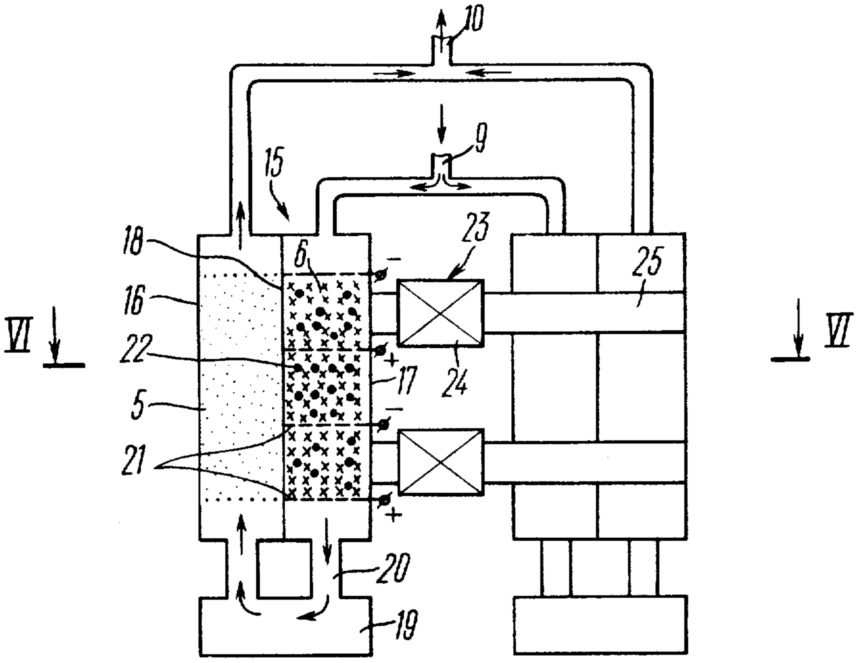
FIG. 5 is a general view of a separator with tubular chambers, radial electrodes and a means of magnetization comprising magnetic circuits and sources of magnetic field.
Figure 6:
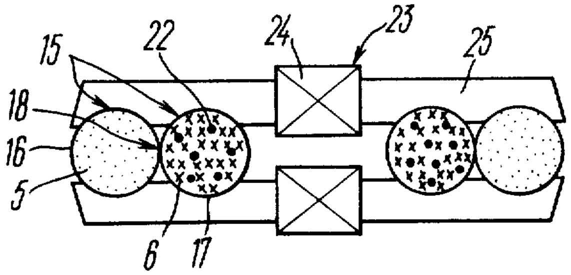
FIG. 6 is a section on line VI—VI of FIG. 5.

The separator shown in FIGS. 5 and 6 features two housings 15 each having two tubular chambers 16 and 17 arranged pairwise, their contiguous walls functioning as a partition 18. The chambers 16 and 17 of each pair communicate with each other by way of a space 19 and pipes 20. The chamber 17 is also provided with an even number of radial electrodes 21 alternately connecting across the unlike terminals of a source of power (not shown). A feature of this modification of the separator is the addition of a ferromagnetic packing 22 to the ferroelectric packing 6. The means of magnetization is provided in this case in the form of electromagnets 23 composed of windings 24 would around magnetic circuits 25.

The axial electrode 13 and the radial ones 21 referred to above as well as the ferromagnetic packing 22 added to the ferroelectric one are thought of as features of all the modifications of the separator illustrated in FIGS. 1 through 6 and all other separators within the scope of the invention.

Practical for use as the ferromagnetic filtering packing 5 and the ferromagnetic packing 22 added to the ferroelectric filtering packing 6 are, for example, balls, comminuted chips and other small ferromagnetic bodies. They must possess corrosion-inhibiting properties to prevent contamination of the fluid. The ferroelectric filtering packing 6 may be provided in the form of, for example, pellets in barium titanate, germanium telluride, lithium niobate, bismuth titanate and other ferroelectric materials depending on the properties of the fluid cleaned and the polarizing effect each particular material exhibits. To prevent any reduction of the effect of the magnetic field, the housings 1, 15, the partitions 2, 18 and the walls of the chamber 12 are made from a nonmagnetic material, preferably from rustless nonmagnetic steel or fluorineplastic.

The separator operates on the following lines. Once the means 7 (FIGS. 1-4) or 23 (FIGS. 5, 6) of magnetization is energized, the ferromagnetic packing 5 is magnetized and so is the ferromagnetic packing 22 added to the ferroelectric packing 6. At the same time a voltage applied across the electrodes 13 (FIGS. 3, 4) or 21 (FIGS. 5, 6) gives rise to the electric polarization of the ferroelectric packing 6 (this step is of particular value when the packing is devoid of spontaneous polarization). A fluid admitted into the chamber 4 (FIGS. 1, 2) or 12 (FIGS. 3, 4) or 17 (FIGS. 5, 6) over the pipe 9 is separated from the electrically charged and ferromagnetic particles while passing in succession through the ferroelectric packing 6, the space 8 (FIGS. 1-4) or 19 (FIGS. 5, 6) and the ferromagnetic packing 5 contained in the chamber 4 (FIGS. 1, 2) or 11 (FIGS. 3, 4) or 16 (FIGS. 5, 6). The purified fluid is discharged through the pipe 10.

The electrode 13 (FIGS. 3, 4) or the electrodes 21 (FIGS. 5, 6) enable the process of filtration to be controlled by changing the degree of electric polarization of the ferroelectric packing 6 depending on the properties of the fluid medium and those of the particulate material. They also provide for the depolarization and regeneration of the ferroelectric packing 6 from time to time.

By virtue of the ferromagnetic packing 22 (FIGS. 5, 6) added to the ferroelectric packing 6, the magnetic field established in the chambers 17 is augmented. This brings about a more stronger magnetization of the minute ferromagnetic particles which, consequently, tend to stick together and form larger particles while passing through the chambers 17 and the connecting spaces 19, i.e. before entering the chambers 16 with the ferromagnetic packing 5. A higher than ever before degree of purification and improved product quality are apparent in this case.

If the ferroelectric packing is made from an electret, the electrodes 21 are connected across a source of power only from time to time for the depolarization of the electret to carry out its regeneration and for a polarization after the regeneration to restore the packing.

What is claimed is:

1. A separator for separating a fluid medium from minute particles of impurities, comprising:

a housing, a partition in said housing, a first chamber and a second chamber defined in said housing by said partition, a means defining space at an end of said housing which connects said chambers to each other, a pipe means connected at a second end of said housing for feeding the fluid medium into said first chamber, a second pipe means connected at the second end of said housing for discharging cleaned fluid medium from said second chamber, a ferroelectric filtering packing contained in said first chamber, a ferromagnetic filtering packing contained in said second chamber, and a magnetic system for producing a magnetic field in the zone of said housing through both said first and second chamber.

2. A separator as claimed in claim 1, wherein said ferroelectric packing is made from an electret.

3. A separator as claimed in claim 1, wherein said chamber with said ferroelectric packing also contains a ferromagnetic packing.

4. A separator as claimed in claim 1, wherein said ferroelectric packing in said first chamber is spontaneously polarized in the absence of an electric field being applied thereto.

5. A separator as claimed in claim 1, wherein said first and second chambers are concentrically disposed, with said first chamber disposed inside said second chamber.

6. A separator as claimed in claim 1, comprising a plurality of said first and second chambers in tubular form, with a respective tubular first chamber contacting a respective tubular second chamber along contiguous walls thereof forming said partition.

7. A separator as claimed in claim 6, wherein said chamber containing said ferroelectric packing is provided with at least a pair of radially-extending electrodes through said ferroelectric packing.

* * * * *